United States Patent
Pan et al.

(10) Patent No.: US 7,833,500 B1
(45) Date of Patent: Nov. 16, 2010

(54) ABATEMENT OF MERCURY IN FLUE GAS

(75) Inventors: Wei-Ping Pan, Bowling Green, KY (US); Yan Cao, Bowling Green, KY (US); Bobby I. T. Chen, Bowling Green, KY (US); Chien-Wei Chen, Bowling Green, KY (US)

(73) Assignee: Western Kentucky University, Bowling Green, KY (US)

( * ) Notice: Subject to any disclaimer, the term of this patent is extended or adjusted under 35 U.S.C. 154(b) by 0 days.

(21) Appl. No.: 12/372,308

(22) Filed: Feb. 17, 2009

Related U.S. Application Data

(63) Continuation-in-part of application No. 11/875,583, filed on Oct. 19, 2007.

(60) Provisional application No. 60/969,423, filed on Aug. 31, 2007.

(51) Int. Cl.
*B01D 53/64* (2006.01)

(52) U.S. Cl. .......... 423/210; 95/134

(58) Field of Classification Search .......... 423/210; 95/134
See application file for complete search history.

(56) References Cited

U.S. PATENT DOCUMENTS

| | | | |
|---|---|---|---|
| 5,900,042 A | 5/1999 | Mendelsohn et al. | |
| 6,136,281 A * | 10/2000 | Meischen et al. | 423/210 |
| 6,808,692 B2 * | 10/2004 | Oehr | 423/210 |
| 6,878,358 B2 * | 4/2005 | Vosteen et al. | 423/210 |
| 6,953,494 B2 * | 10/2005 | Nelson, Jr. | 95/134 |
| 7,118,720 B1 | 10/2006 | Mendelsohn et al. | |
| 7,381,380 B2 | 6/2008 | Herbst | |
| 7,479,263 B2 * | 1/2009 | Chang et al. | 423/210 |
| 7,521,032 B2 | 4/2009 | Honjo et al. | |
| 7,674,442 B2 * | 3/2010 | Comrie | 423/210 |
| 2004/0013589 A1 | 1/2004 | Vosteen et al. | |
| 2004/0253158 A1 | 12/2004 | Honjo et al. | |
| 2005/0147549 A1 | 7/2005 | Lissianski et al. | |
| 2006/0048646 A1 | 3/2006 | Olson et al. | |
| 2006/0120933 A1 | 6/2006 | Boardman et al. | |
| 2008/0069749 A1 | 3/2008 | Liu et al. | |
| 2008/0107579 A1 * | 5/2008 | Downs et al. | 423/210 |

FOREIGN PATENT DOCUMENTS

JP 61257223 11/1986

* cited by examiner

*Primary Examiner*—Timothy C Vanoy
(74) *Attorney, Agent, or Firm*—John F. Salazar; Charles G. Lamb; Middleton Reutlinger

(57) ABSTRACT

The present invention provides a method for the oxidation of $Hg^0$ in coal fired flue gas to form $Hg^{2+}$ which is absorbed by the scrubber solution in wet-FGD or SDA, or adsorbed by the fly ash and subsequently removed from the flue stack with ESP and FF, and/or any other means as are known in the art for $SO_x$, $NO_x$ and particulate removals. The addition of a second flue gas stream having a halogen and fly ash therein simultaneously with said hydrogen halogen or interhalogens into a coal fired flue gas further increases the oxidation of $Hg^0$ to $Hg^{2+}$.

11 Claims, 15 Drawing Sheets

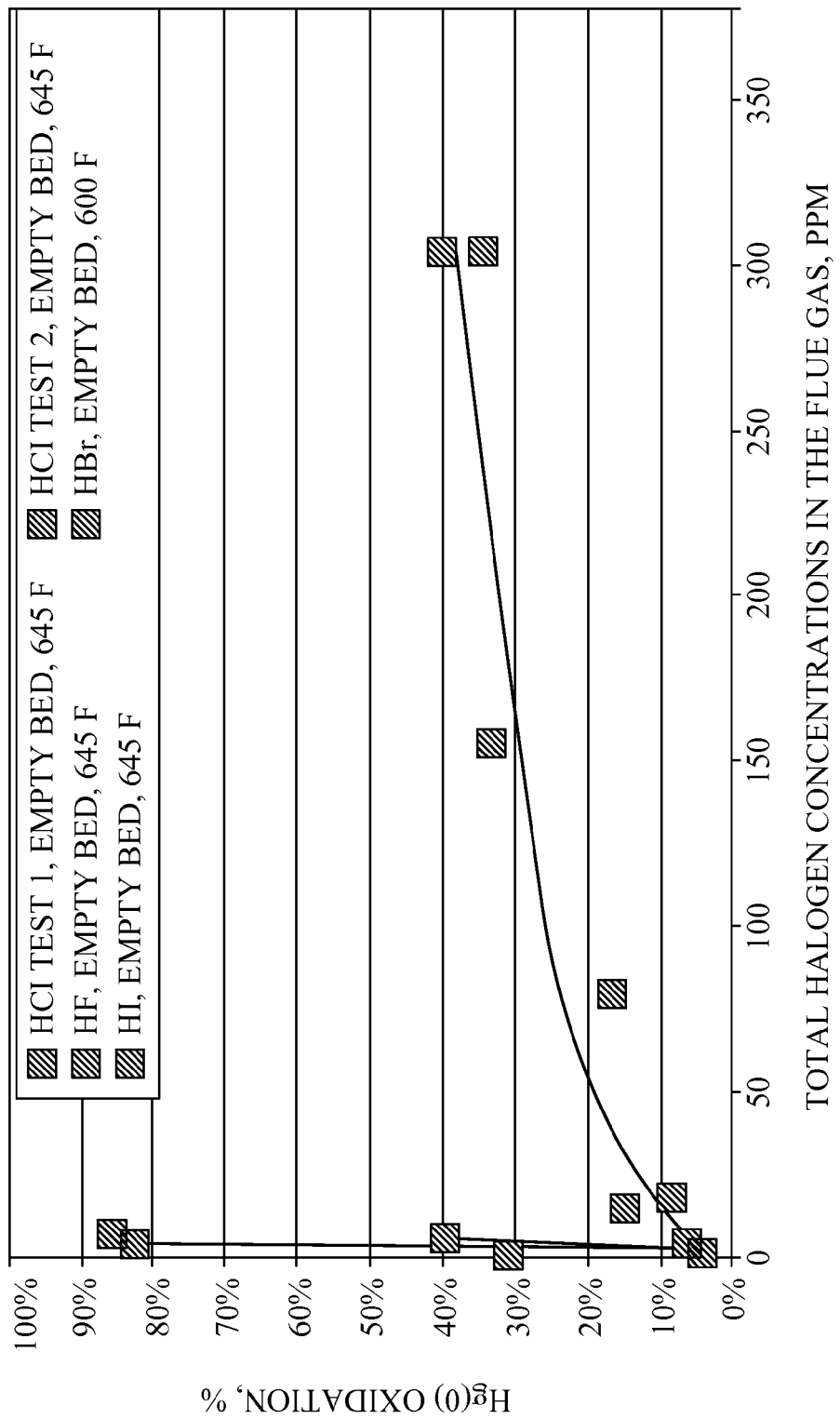

EQUILIBRIUM MERCURY SPECIES SPECIFICATION UNDER TYPICAL FLUE GAS CONDITIONS BURNED BY BITUMINOUS COAL WITH HIGH SULFUR AND CHLORINE.

EQUILIBRIUM MERCURY SPECIES SPECIFICATION UNDER TYPICAL FLUE GAS CONDITIONS BURNED BY BITUMINOUS COAL WITH MEDIUM SULFUR AND CHLORINE.

EQUILIBRIUM MERCURY SPECIES SPECIFICATION UNDER TYPICAL FLUE GAS CONDITIONS BURNED BY SUB-BITUMINOUS COAL OR LIGNITE WITH HIGH SULFUR AND CHLORINE.

CORRELATION OF HBr INJECTION CONCENTRATIONS AND MERCURY REMOVAL EFFICIENCY IN THE SLIPSTREAM REACTOR

CORRELATION OF HBr INJECTION CONCENTRATIONS AND MERCURY OXIDATION EFFICIENCY IN THE SLIPSTREAM REACTOR

THE MERCURY REMOVAL EFFICIENCIES BY SIMULTANEOUS ADDITIONS OF HBr (AT 4PPM) AND SELECTED FLY ASHES

ABATEMENT OF MERCURY IN FLUE GAS

CROSS-REFERENCE TO RELATED APPLICATION

This continuation-in-part application claims priority to and benefit from, currently pending, U.S. patent application Ser. No. 11/875,583 filed on Oct. 19, 2007, which, under 35 USC §119(e), claims priority to, and benefit from, U.S. Provisional Application Ser. No. 60/969,423, filed on Aug. 31, 2007, entitled "Abatement of Mercury in Flue Gas".

BACKGROUND OF THE INVENTION

1. Field of the Invention

The present invention relates generally to a process for removing elemental mercury from flue gases.

2. Description of the Related Art

Introduction

Mercury emissions are regarded as one of the worlds most problematic environmental issues, because of their propensity to bio-accumulate by up to a factor of 10,000 within an aquatic food chain. Mercury, after bioaccumulation, may result in neuron damage of human beings. It is estimated that 80% of total anthropogenic mercury emissions from 1994 to 1995 was from combustion; of which 33% was associated with coal-fired utility boilers. The United States Environmental Protection Agency (USEPA) announced its final regulations on mercury emissions from coal-fired utility boilers in March of 2005. This regulation stated that yearly mercury emissions are to be reduced by 20.8% by 2010 and 68.8% by 2018 from levels in 1999.

Mercury occurs in the flue gas of coal-fired utility boilers in three valence states, elemental $Hg^0$, oxidized ($Hg^{2+}$), and particle-bound (Hg(P)). There are known techniques for the effective removal of $Hg^{2+}$ and Hg(P) from flue gases. However, $Hg^0$ is relative stability, water insolubility, and has a long range transportation in the atmosphere as compared to $Hg^{2+}$ and Hg(P). Thus, it is desirable to effectively convert $Hg^0$ to $Hg^{2+}$ or $Hg^0$ and $Hg^{2+}$ to Hg(P) so that the known removal techniques may be employed for the removal of $Hg^0$ from flue gas.

The combined utilization of selective catalytic reduction (SCR) to oxidize the $Hg^0$ into $Hg^{2+}$ and the subsequent $Hg^{2+}$ removal by wet-flue gas desulphurization (wet-FGD) in coal-fired utilities is known. This method for controlling the emissions of $SO_x$, $NO_x$ and $Hg^0$ has proven effective when burning some coals such as bituminous coals, but simultaneous availability of both SCR and wet-FGD is limited in the united states (approximately 25%). Moreover, this method has not been shown to be effective when burning Powder River Basin (PBR) coal or lignite. Bituminous coals generally have a higher concentration of naturally occurring therein chlorine, sometimes comparable fluorine, which is thought to aid in the oxidation of $Hg^0$. Even though coal likely has other halogens such as bromine and iodine, the concentrations are too low to effectuate the oxidation of the $Hg^0$. Furthermore, presently prevailing Hg control technology is still necessary in Bituminous coal burning plants because of low affinity of mercury to the fly ash. It is indicated economics of mercury capture technology is directly relative to the percentage of Hg(P) in Hg(VT) because over 80% of coal-fired power plants are equipped with fly ash removal facilities, such as cold-side ESP (electric precipitator) and FF (fabric filter). Therefore, conversion of either $Hg^0$ to $Hg^{2+}$ and/or $Hg^0$ and $Hg^{2+}$ to Hg(P), in all coal-derived flue gas seems limited.

SUMMARY OF THE INVENTION

The present invention provides a method for the enhanced removal of both $Hg^0$ and $Hg^{2+}$ from coal fired flue gas. $Hg^0$ is first oxidized to $Hg^{2+}$ with the introduction of at least one hydrogen halogen into the flue stack. The addition of the hydrogen halogen also increases the absorbtion of $Hg^{2+}$ with fly ash in the flue stack. After oxidation and absorbtion, the $Hg^{2+}$ is removed from the flue stack with known methods such as the wet-flue gas desulphurization (wet-FGD) and/or spray dry desulfurization process (SDA), both of which are also effective for $SO_x$ removal. This method can also be used in conjunction with known methods of removal of Hg(P) from the flue stack such as cold-side electric precipitators (ESP), fabric filters (FF), adsorbents such as activated carbon, and other methods as are known in the art.

The present invention also provides a method for the removal of $Hg^0$ from coal fired flue gas with the introduction of selected fly ash along with the introduction of at least one hydrogen halogen into a flue gas stack. Preferably, the hydrogen halogen is a hydrogen bromide which enhances the mercury captured by the selected fly ash. Preferably, the introduction of the hydrogen halogen and the selected fly ash is simultaneously.

BRIEF DESCRIPTION OF THE DRAWING FIGURES

FIG. 7 is a graphical representation of comparison of $Hg^0$ oxidation as functions of all mentioned hydrogen halogens (HCl, HF, HBr and HI) concentration in the flue gas in the PRB-coal-derived flue gas in the slipstream reactor of FIG. 1.

DETAILED DESCRIPTION OF THE PREFERRED EMBODIMENT(S)

The present invention provides a method for the oxidation of $Hg^0$ in coal fired flue gas to form $Hg^{2+}$ which is then absorbed by the scrubber solution in a wet-FGD and/or SDA, and/or adsorbed by the fly ash and subsequently removed from the flue stack with ESP and/or FF, and/or any other means as are known in the art for $SO_x$, $NO_x$ and particulate removal. The method incorporates the addition of at least one hydrogen halogen into the flue gas generated by the combustion of coal. The hydrogen halogen is advantageously selected from the group consisting HBr, HI, HCl, HF, and combinations thereof. More advantageously the hydrogen halogen has HBr and/or HI. The hydrogen halogen may be introduced into the flue gas in a gaseous or solid form or alternatively in an aqueous solution. When in solution, it is advantageous to have a high concentration of the hydrogen halogen, in excess of 40%, more advantageously about 43%. It is advantageous that the flue gas be at most 400° C. and more advantageously be within a range of about 50° C. and about 400° C. The advantageous concentration of hydrogen halogen fed into the flue gas is between about 0.1 ppm and 100 ppm. The hydrogen halogen may be fed at various injection ports throughout the process flow affecting the oxidation of $Hg^0$ and/or the adsorbtion of Hg onto fly ash.

Figure 1:
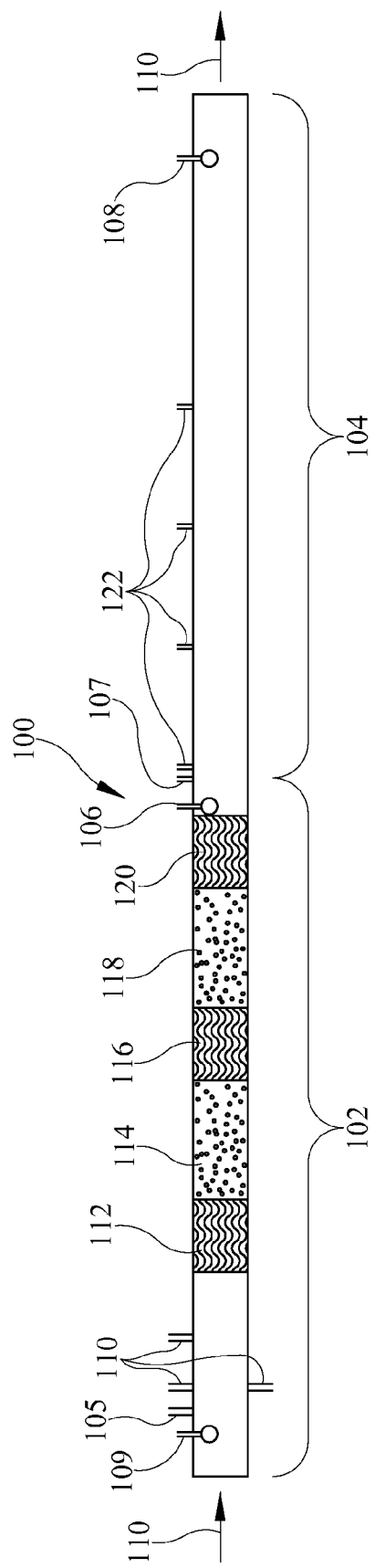
FIG. 1 is a process flow scheme showing a slip stream reactor, which was used for process demonstration in examples 1-6.
Figure 2:
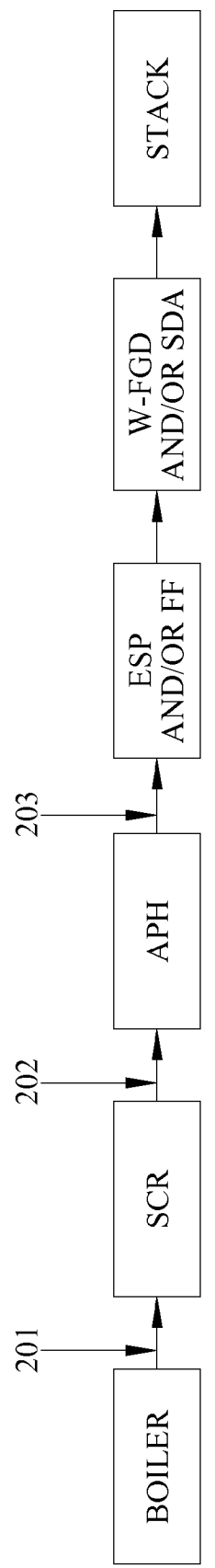
FIG. 2 is a process flow diagram of a typical coal fired boiler system showing the incorporation of the process of the present invention.

FIG. 2 shows a typical process flow diagram of flue gas generated by a coal fired boiler. The boiler generates flue gas 110 (shown in FIG. 1) having ash and other products of combustion including speciated and elemental mercury $Hg^0$. The flue gas is first passed to a selective catalytic reactor (SCR) 102 (shown in FIG. 1) wherein a portion of the $Hg^0$ is oxidized. SCR 102 may or may not have a catalyst therein. Approximately 25% of the coal fired boiler facilities in the US have an SCR. The process of the present invention is used in conjunction with or in place of an SCR, making the process applicable to systems with and without an SCR. As shown in the process flow diagram of FIG. 1 and discussed in the examples, the hydrogen halogen may be fed into the gas stream and mixed therein before optionally encountering a catalyst in the SCR. After the flue gas passes through the SCR it is cooled in the air preheater (APH). The cooled flue gas is then optionally passed through an electrostatic precipitator (ESP) and/or fabric filter (FF) where ash and other particulate materials are removed including particle-bound (Hg(P)) adhered to the ash. From the ESP the flue gas is optionally fed to a wet-flue gas desulphurization (W-FGD) unit and/or spray dry desulfurization process (SDA) wherein additional materials, including $Hg^{2+}$, are removed. Approximately 20% of the coal fired boiler systems in the US have a FGD unit or a SDA unit, however the process of the present invention is applicable to all coal fired boiler systems as a large percentage of the $Hg^{2+}$ produced by the introduction of the hydrogen halogen oxidizing the $Hg^0$ is removed with the ESP and or FF, making the FGD unit optional. The hydrogen halogen may be introduced into the process at various points, 201, 202, and/or 203. Typically, increasing oxidation of $Hg^0$ is accomplished with the introduction of the hydrogen halogen(s) earlier in the system at ports 201 and/or 202 where the temperature of flue gas 110 is at an elevated temperature. However, increasing adsorption of $Hg^{2+}$ with the fly ash may be accomplished with the introduction of the hydrogen halogen(s) later in the system at ports 202 and/or 203 where the temperature of flue gas 110 is at a decreased temperature. It is to be understood that the hydrogen halogen(s) may be introduced into the system at any or each introduction point 201, 202, and 203. Surplus hydrogen halogens may be removed from the flue gas through the ESP, FF, W-FGD, and/or SDA processes. After the FGD, the flue gas is released to the stack.

A method of the present invention is disclosed in examples wherein a schematic of the process system is shown in FIG. 1. Slipstream reactor 100 is in a concentric configuration and is insulated by bypassed flue gas in order to minimize temperature drop inside selective catalytic reactor (SCR) 102, the oxidation side of slipstream reactor 100, and the absorption side 104 of slipstream reactor 100. The temperature drop within SCR 102 was less than 20° C. for each example. The average temperature inside SCR reactor 102 was at most 400° C. and advantageously between 50° C. and 400° C., more advantageously between 150° C. and 400° C., and most advantageously between 300° C. and 400° C. In the following examples, SCR 102 was left as an empty reactor or loaded with different catalysts for comparison of the effectiveness of the removal of $Hg^0$ with the introduction of a hydrogen halogen. The reactor inlet sampling port 105 and the reactor outlet sampling port 107 in SCR 102 were used to sample the flue gas 110 before entering SCR 102 and at the exit of SCR 102. Inlet thermocouple 109 and outlet thermocouple 106 in SCR 102 were used to monitor the temperature of the flue gas 110 before entering SCR 102 and at the exit of SCR 102. The residence time of flue gas 110 inside SCR 102 was controlled between 0.1 and 5 seconds, advantageously about 1 second. A first static mixer 112 is optionally located adjacent an inlet of catalyst chamber 114, second static mixer 116 is optionally located between catalyst chambers 114 and 118, and third static mixer 120 is optionally located proximate the outlet of SCR 102. Following static mixer 116 is second catalyst chamber 118 which is followed by third static mixer 120. Injection ports 110 are located upstream from first static mixer 112 and serve as an entry point for reactants such as hydrogen halogens added to slipstream reactor 100. Injection ports 122 in absorption/adsorbtion reactor 104 are used to optionally introduce a coolant, such as liquid nitrogen, to cool flue gas 110.

To control the temperature drop from about 350° C. on an average to less than 300° C., advantageously about 150° C. on an average and quenching rate in absorption reactor 104, liquid nitrogen was used by injecting it into four stages through four injection ports 122 by solenoid valves. Specially-designed nozzles distributed liquid nitrogen uniformly in the cross section of absorption reactor 104 at the injection ports 122. Optionally, static mixers may be placed downstream of injection nozzles 122 to assist in mixing the coolant, such as liquid nitrogen, into the flue gas passing therethrough. After injection into ports 122, the coolant is vaporized, cooling the hot flue gas to a desired temperature of at most 300° C., advantageous about 150° C., at thermocouple 108 by selected cooling rates. Thermocouple 108 monitored temperature and provided a feedback signal to a flow controller of liquid nitrogen into ports 122. If thermocouple 122 returned a temperature signal higher than what was desired, the controller allowed more liquid nitrogen to be injected into ports 122 by enlarging the opening of a solenoid valve.

Powder River Basin (PRB) coal was used in Examples 1-4 and was sampled and analyzed. Fly ash generated by the combustion of PRB was also sampled and analyzed. Examples with and without SCR catalysts in the slipstream reactor 100 were conducted. Sulphur, chlorine and mercury contents in three samples of the PRB coal to be burned were determined to be 0.37%, 72 ppm and 0.08 ppm; 0.44%, 127 ppm and 0.07 ppm; and 0.39%, 88 ppm and 0.09 ppm. The average sulphur, chlorine and mercury contents in the PRB coal to be burned was approximately 0.4, 100, and 0.08 respectively. The bromine and iodine content in the sampled coal was under the detection limit (less than 5 ppm). Examples were conducted without loading of a catalyst in SCR 102, with loading of Catalyst #1, and with loading of Catalyst #2.

The average temperature of the SCR 102 in Examples 1-4 varied between about 325° C. and about 365° C. The residence time of flue gas inside the slipstream reactor was controlled to be between 0.1 and 5 seconds, advantageously about 1 second. When the SCR catalyst was loaded, the space velocity (the ratio of volumetric gas flow to catalyst volume) was set at 3600 $hr^{-1}$. Commercial honeycomb SCR catalysts were provided by two commercial vendors and are referred to in the examples as Catalyst #1 and Catalyst #2.

$NH_3$, HCl, HBr, HI, and HF gases were injected in the slipstream reactor by the control of a Mass Flow Controller (MFC). HI and HF were injected using HI and HF aqueous solutions of about 43% halogenated hydrogen. Static mixers 112, 116, and 120 in the slipstream reactor 100 ensured good mixing of additives and flue gas 110. All additives were injected through several ports 110, which were after the mercury sampling port 105 proximate SCR 102 inlet, thus keeping inlet sampling port 105 unaffected by additives. In Examples 1-4, the additional concentration of the individual additives or spike gases in the flue gas were controlled within ranges of about 0-300 ppm for HCl, about 0-9 ppm for HBr, about 0-20 ppm for HF and about 0-15 ppm for HI.

Example 1

Figure 3:
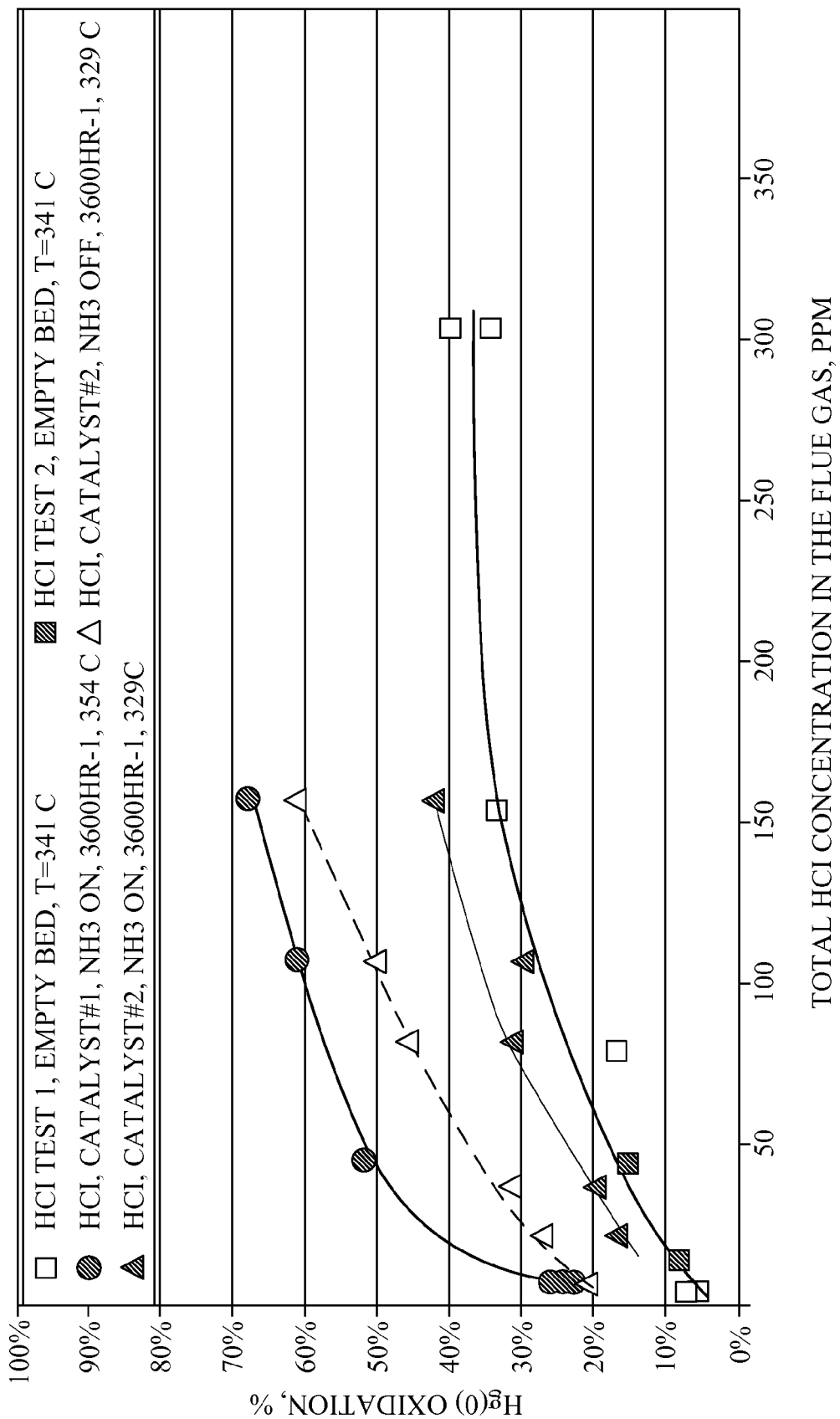
FIG. 3 is a graphical representation of $Hg^0$ oxidation as a function of HCl concentration in the PRB-coal-derived flue gas in the slipstream reactor of FIG. 1.

HCl was added to injection port 110 and catalyst chambers 114 and 118 were not loaded, loaded with Catalyst #1, and loaded with Catalyst #2. The average temperature of SCR 102 in this example varied between about 330° C. and about 365° C. The results of this example are graphically represented in FIG. 3. The effects of the spike gas HCl on the $Hg^0$ oxidation during this example in an empty slipstream reactor 100 showed a positive impact in increasing the concentration of $Hg^{2+}$ in the flue gas when burning PRB coal as compared to a blank run having no HCl spike. The empty slipstream reactor indicated that the percentage of $Hg^0$ oxidation increased to 7.9%, 15.2%, 16.7%, 33.5% and 37.5% with incremented additions of HCl of about 10, 40, 75, 150 and 300 ppm corresponding to total chlorine concentrations, addition and naturally occurring, of approximately 16.9, 44, 79, 154 and 304 ppm, respectively. When the HCl addition concentration was increased above 150 ppm, the $Hg^0$ oxidation curve became flat. $NH_3$ is optionally injected into ports 110 during examples having a catalyst in SCR 102 potentially increasing catalytic oxidation. During examples with SCR Catalyst #1 in the SCR slipstream reactor a $NH_3$ addition ratio of about ($NH_3$/NO~1) was made. The percentages of $Hg^0$ oxidation largely increased by approximately 30% in comparison to those under examples in the empty slipstream reactor at similar HCl addition concentrations. With the HCl additions at 100 ppm and 150 ppm, the $Hg^0$ oxidation increased to about 62% and 68%, respectively. During examples with SCR Catalyst #2 at a similar $NH_3$ addition ratio of about ($NH_3$/NO~1), the additional oxidation of $Hg^0$ was approximately 30% and 45%, respectively, at HCl additions of about 100 ppm and 150 ppm. The additional $Hg^0$ oxidation in the examples having catalysts in SCR 102 over those in the empty SCR 102 was only about 10% at similar HCl addition concentrations. Thus, both Catalyst #1 and Catalyst #2 were shown to have positive catalytic effects, but to a different extent, on $Hg^0$ oxidation. For SCR Catalyst #2, stopping injection of $NH_3$ improved $Hg^0$ oxidation by approximately 15%. Therefore, $NH_3$ addition had a negative impact on the $Hg^0$ oxidation process for SCR Catalyst #2.

Example 2

Figure 4:
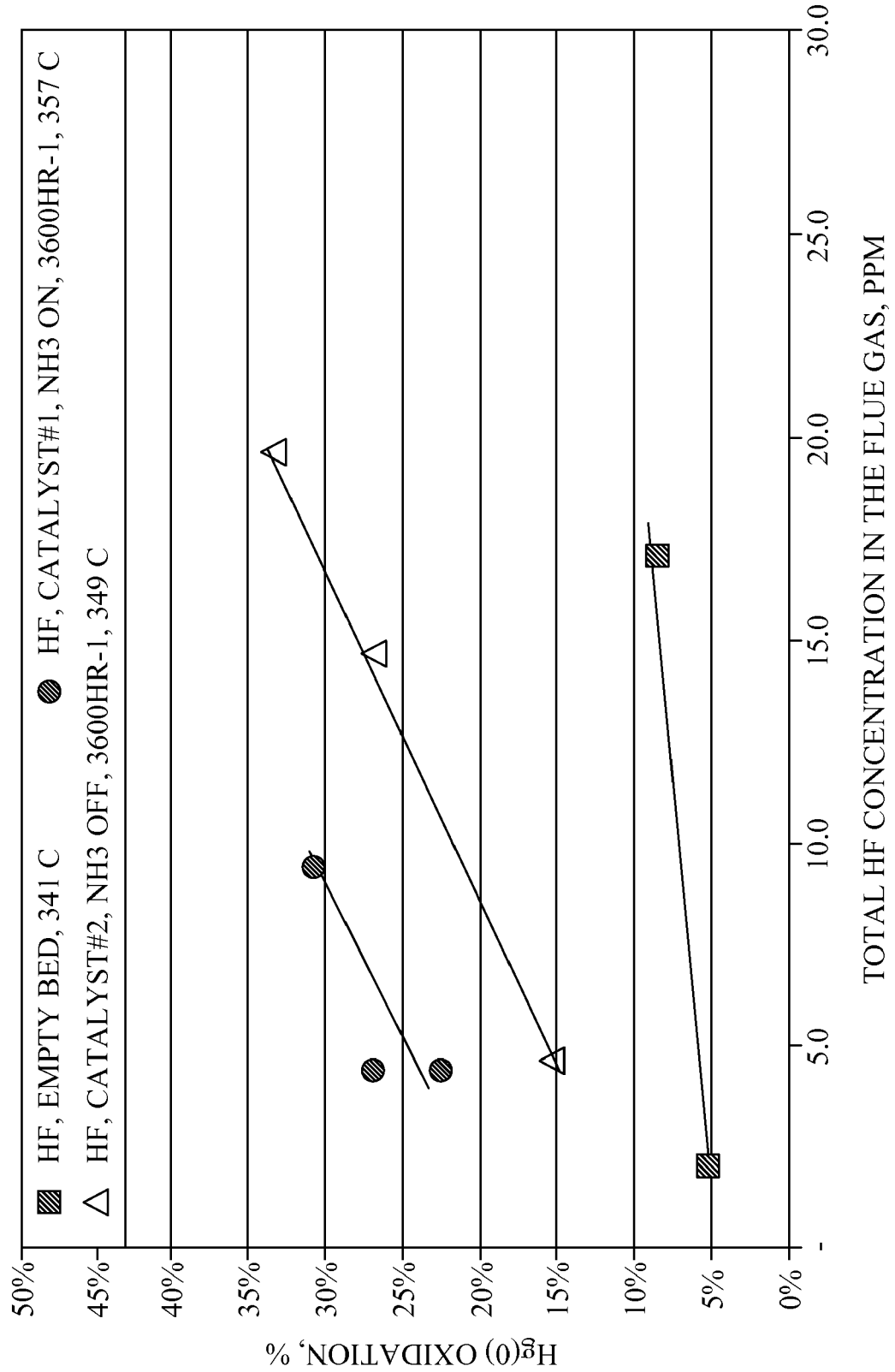
FIG. 4 is a graphical representation of $Hg^0$ oxidation as a function of HF concentration in the flue gas in the PRB-coal-derived flue gas in the slipstream reactor of FIG. 1.

Hydrogen Fluoride (HF) was added to injection port 110 and catalyst chambers 114 and 118 were not loaded, loaded with Catalyst #1, and loaded with Catalyst #2. Fluorine is a naturally occurring halogen element in PRB coal, however the natural concentrations are not sufficient to provide desired amount of $Hg^0$ oxidation. The natural content varied between 20 ppm to 50 ppm and was comparable to that of chlorine (100 ppm on an average) in PRB coal. The effects of spike HF gases on $Hg^0$ oxidation during examples in an empty slipstream reactor and SCR slipstream reactor are shown in FIG. 4. HF additions showed a positive impact to increase the $Hg^{2+}$ in the flue gas when burning PRB coal. In the empty slipstream reactor, the percentage of $Hg^0$ oxidation was 8.5% with an HF addition concentration of up to about 15 ppm (the total fluorine concentration in the flue gas, including naturally occurring, was approximately 17.5 ppm). In the SCR slipstream reactor with Catalyst #1 with $NH_3$ addition, the $Hg^0$ oxidations were about 25% and 30% with the addition of HF at about 3 ppm and 8 ppm respectively (the total fluorine concentrations in the flue gas, including naturally occurring, were at about 5 ppm and 10 ppm). In the SCR slipstream reactor with Catalyst #2, without $NH_3$ addition, the $Hg^0$ oxidations were approximately 15%, 26% and 34% with HF addition at 3 ppm, 13 ppm and 18 ppm respectively (the total Fluorine concentrations, including naturally occurring, in the flue gas was about 5 ppm, 15 ppm and 20 ppm respectively). Thus, both SCR catalysts in this example promoted further $Hg^0$ oxidation in comparison to the examples having an empty slipstream reactor 100.

Example 3

Figure 5:
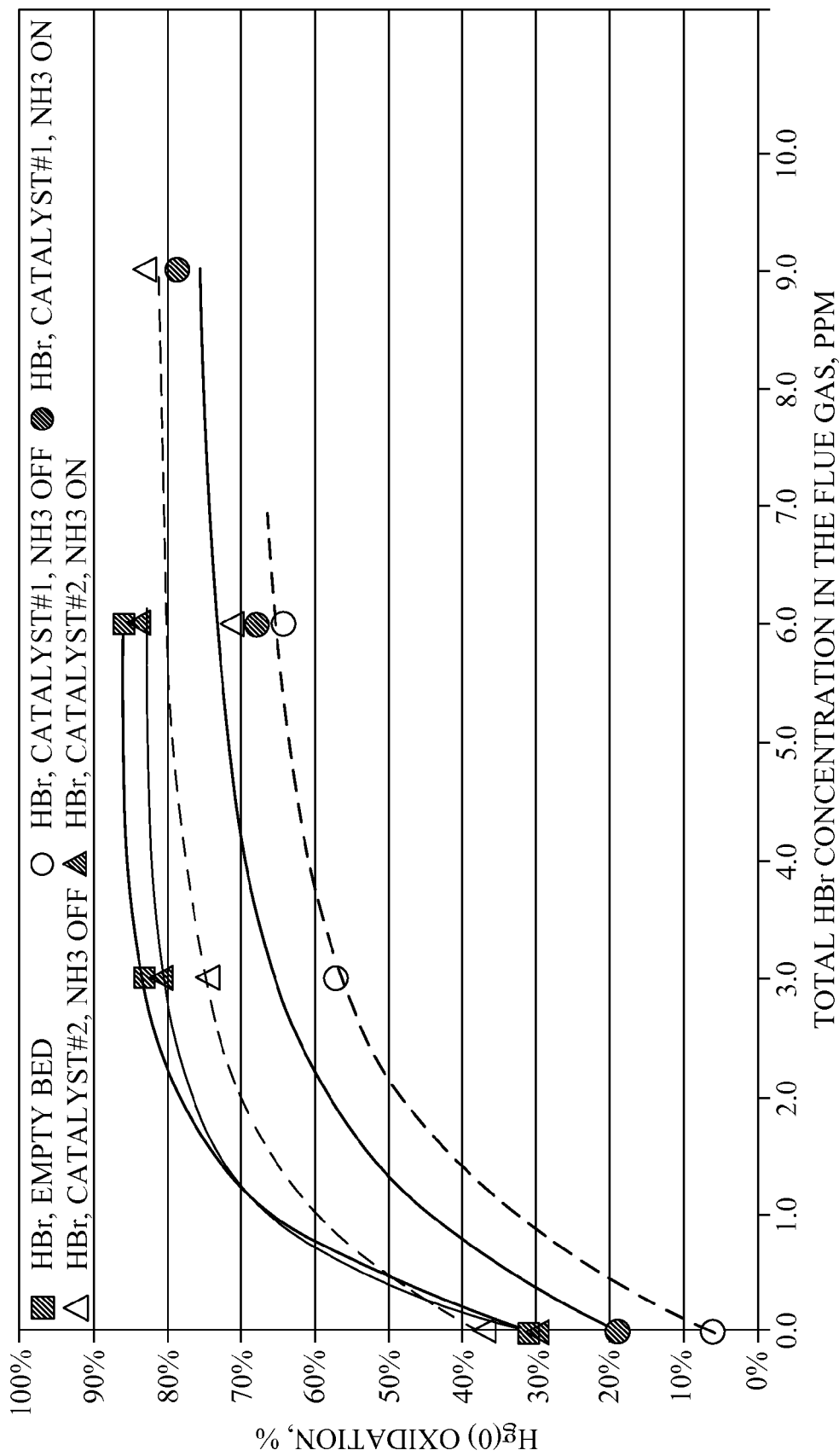
FIG. 5 is a graphical representation of $Hg^0$ oxidation as a function of HBr concentration in the flue gas in the PRB-coal-derived flue gas in the slipstream reactor of FIG. 1.

Hydrogen Bromide (HBr) was added to injection port 110 and catalyst chambers 114 and 118 were not loaded, loaded with Catalyst #1, and loaded with Catalyst #2. The effects of HBr additions on $Hg^0$ oxidation in the slipstream reactor 100 are shown in FIG. 5. HBr showed a very strong impact in increasing $Hg^{2+}$ in the PRB coal-derived flue gas atmosphere in an empty slipstream reactor 100 and in the catalyst loaded slipstream reactor 100. Examples in the empty slipstream reactor showed the percentage of $Hg^0$ oxidation to increase to about 83% and 85.9% with additional concentrations of HBr at 3 ppm and 6 ppm, respectively. During examples with SCR Catalyst #1 at a preferred $NH_3$ addition ratio of about ($NH_3$/NO~1), the percentages of $Hg^0$ oxidation was approximately 68.2% and 78.9% at HBr addition concentrations of 6 ppm and 9 ppm, respectively. With $NH_3$ addition being turned off, the percentages of $Hg^0$ oxidation were approximately 57.3% and 64.4% at HBr addition concentrations of 3 ppm and 6 ppm, respectively. During examples with SCR Catalyst #2, at a similar $NH_3$ addition ratio of about ($NH_3$/NO~1), the percentages of $Hg^0$ oxidation was approximately 74.7% and 83.2% at HBr addition concentrations of 3 ppm and 9 ppm, respectively. With $NH_3$ addition being turned off, the percentages of $Hg^0$ oxidation were approximately 81% and 84.2% at HBr addition concentrations of 3 ppm and 6 ppm, respectively. The correlation of oxidation results from examples in the empty slipstream reactor 100 and SCR slipstream reactor 102 with Catalyst #2 indicated SCR Catalyst #2 does not have apparent promotion of $Hg^0$ oxidation and thus is independent of impacts of $NH_3$ additions. Examples with SCR Catalyst #1 showed a little lower $Hg^0$ oxidation efficiencies with HBr addition, compared to cases in the empty slipstream reactor 100 and SCR slipstream reactor 102 and with Catalyst #2. The $Hg^0$ oxidation efficiencies were approximately 6.1% and 19% during examples with SCR Catalyst #1 and increased to 37.2% and 29.8% in the empty slipstream reactor 100. This example shows that the function of HBr on $Hg^0$ oxidation is less dependent on the availability of SCR catalysts.

Example 4

Figure 6:
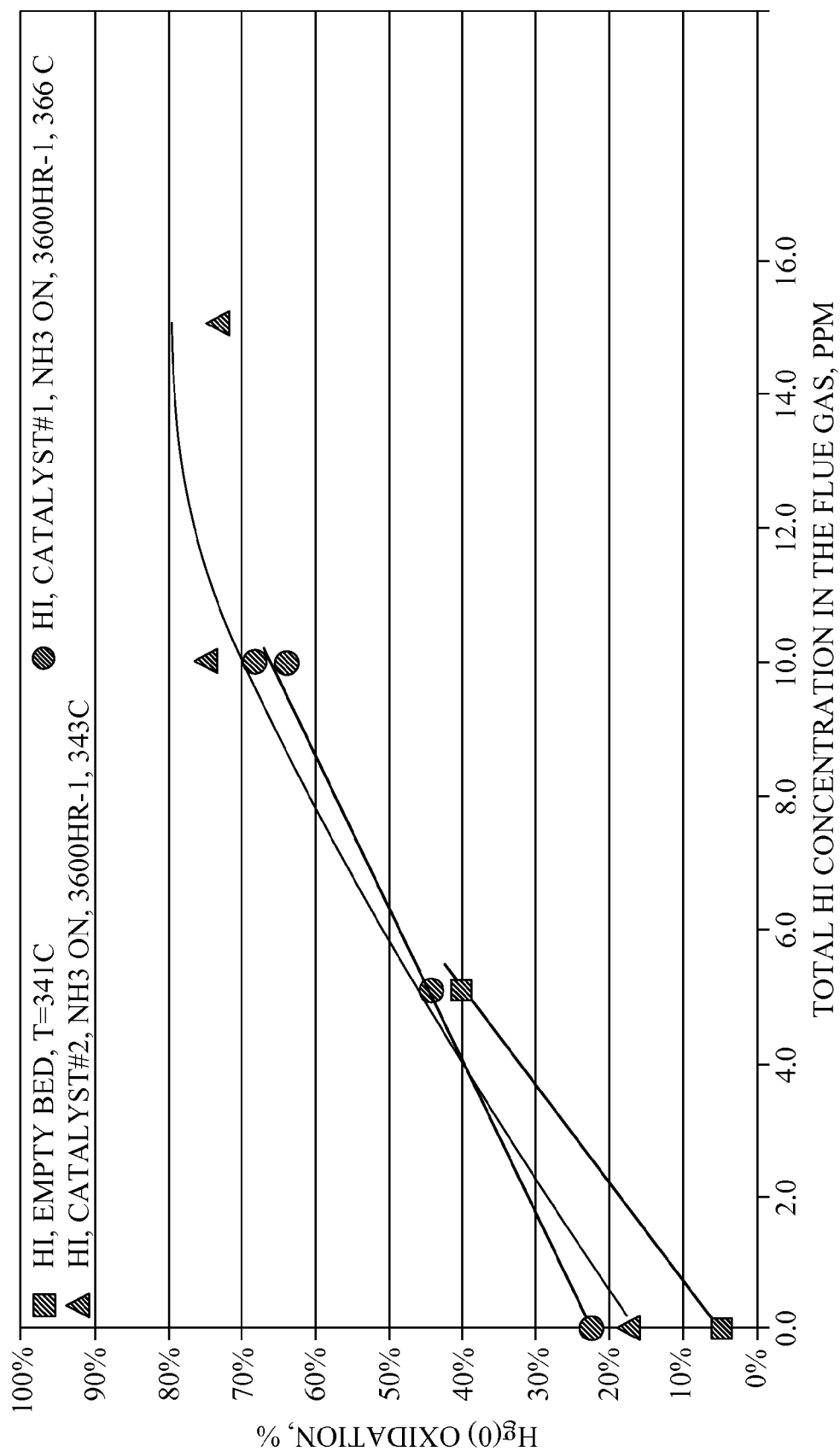
FIG. 6 is a graphical representation of $Hg^0$ oxidation as a function of HI concentration in the flue gas in the PRB-coal-derived flue gas in the slipstream reactor of FIG. 1.

Hydrogen Iodine (HI) was added to injection port 110 and catalyst chambers 114 and 118 were not loaded, loaded with Catalyst #1, and loaded with Catalyst #2. The effects of additions of HI on $Hg^0$ oxidation during this example in an empty slipstream reactor 100 and catalyst loaded SCR slipstream reactor 102 are shown in FIG. 6. In each case, HI additions showed a stronger impact to increase the $Hg^{2+}$ in the flue gas when burning PRB coal. In the empty slipstream reactor, the addition of HI at 5 ppm could achieve approximately 40% of $Hg^0$ oxidation. With the same addition concentration of HI at 5 ppm in the SCR slipstream reactor with Catalyst #1, similarly 40% $Hg^0$ oxidation efficiency could be achieved. When HI addition concentrations increased to 10 ppm, nearly the same $Hg^0$ oxidation efficiencies (approximately 70%) could be achieved for both SCR catalysts. $Hg^0$ oxidation was shown to be independent of the availability of SCR catalysts when HI was added in the flue gas.

Example 4A

FIG. 7 presents a comparison of impacts of different halogens (HCl, HF, HBr and HI) on $Hg^0$ oxidation under a PRB coal-derived flue gas atmosphere, which was made using results from the empty slipstream reactor, as shown in FIG. 1. The maximum $Hg^0$ oxidation efficiency at approximately 40% could be achieved by total HCl concentration at 300 ppm in the flue gas. The increase of $Hg^0$ oxidation efficiency by HF addition seemed to follow the same trend, and was also comparable to the HCl addition at same addition concentration. The tests by additions of HCl and HF in this study was consistent with the lower $Hg^0$ oxidation efficiencies in the full scale utility boilers by burning PRB coal since its chlorine and fluorine contents are lower. As expected, addition of HCl could further increase $Hg^0$ oxidation, which can be catalyzed by both of the evaluated SCR catalysts. For comparison, by achieving the same $Hg^0$ oxidation efficiency at approximately 40% in the empty slipstream reactor (the baseline $Hg^0$ oxidation at about 5%), the addition of HI concentration in the flue gas only needed to be 5 ppm. Moreover, HBr addition concentration at only 3 ppm could achieve the $Hg^0$ oxidation efficiency as high as above 80% in the empty slipstream reactor (the baseline $Hg^0$ oxidation at about 30%). Both HBr and HI showed much stronger impacts on the $Hg^0$ oxidation than those by HCl and HF at the same addition concentrations.

Example 4B

Figure 8A:
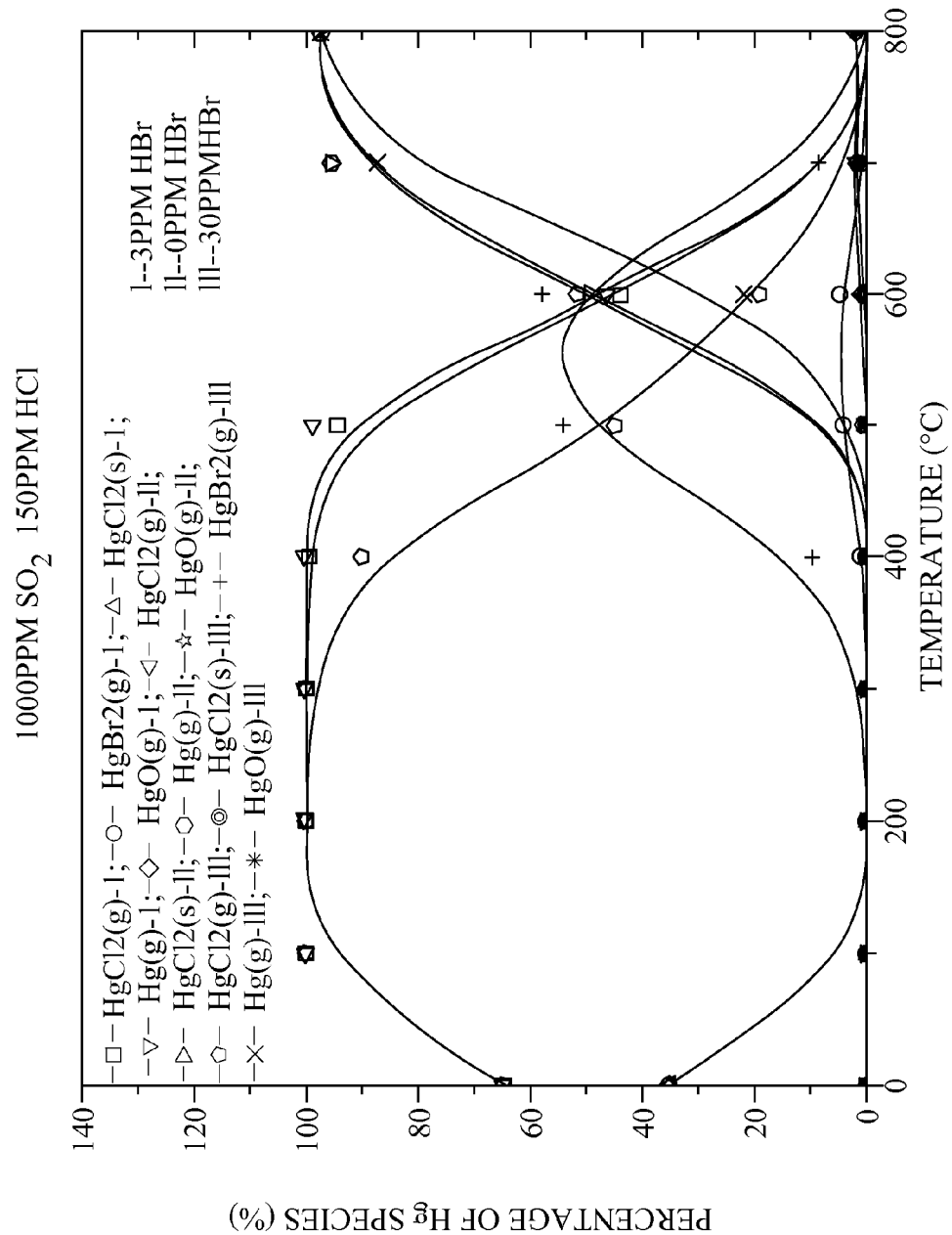
FIGS. 8A-8C are graphical representations of thermodynamics calculation to predict $Hg^0$ oxidation as functions of two mentioned hydrogen halogens (HCl and HBr) concentrations in flue gas streams from selection of different coal sources.
Figure 8B:
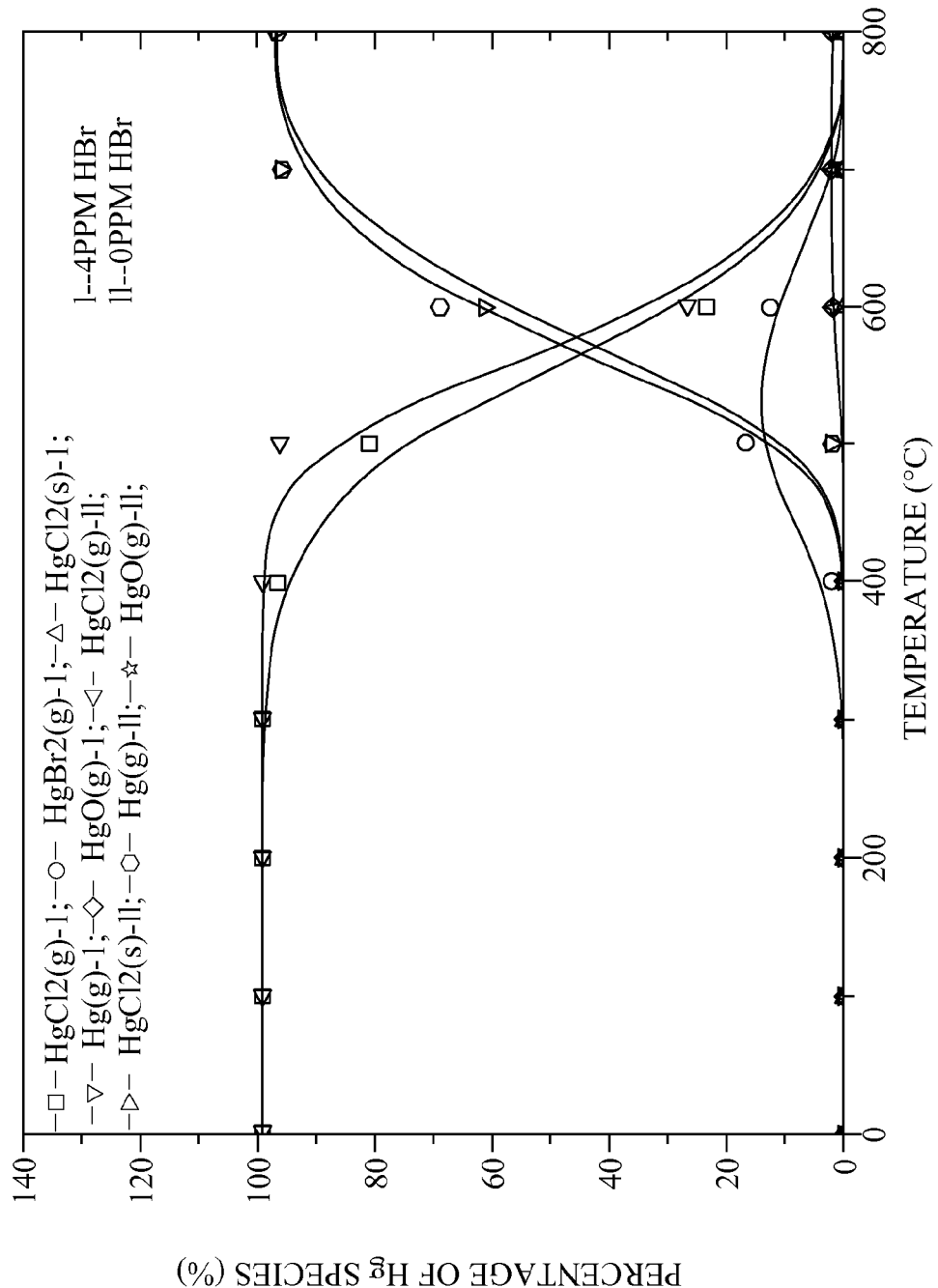
Figure 8C:
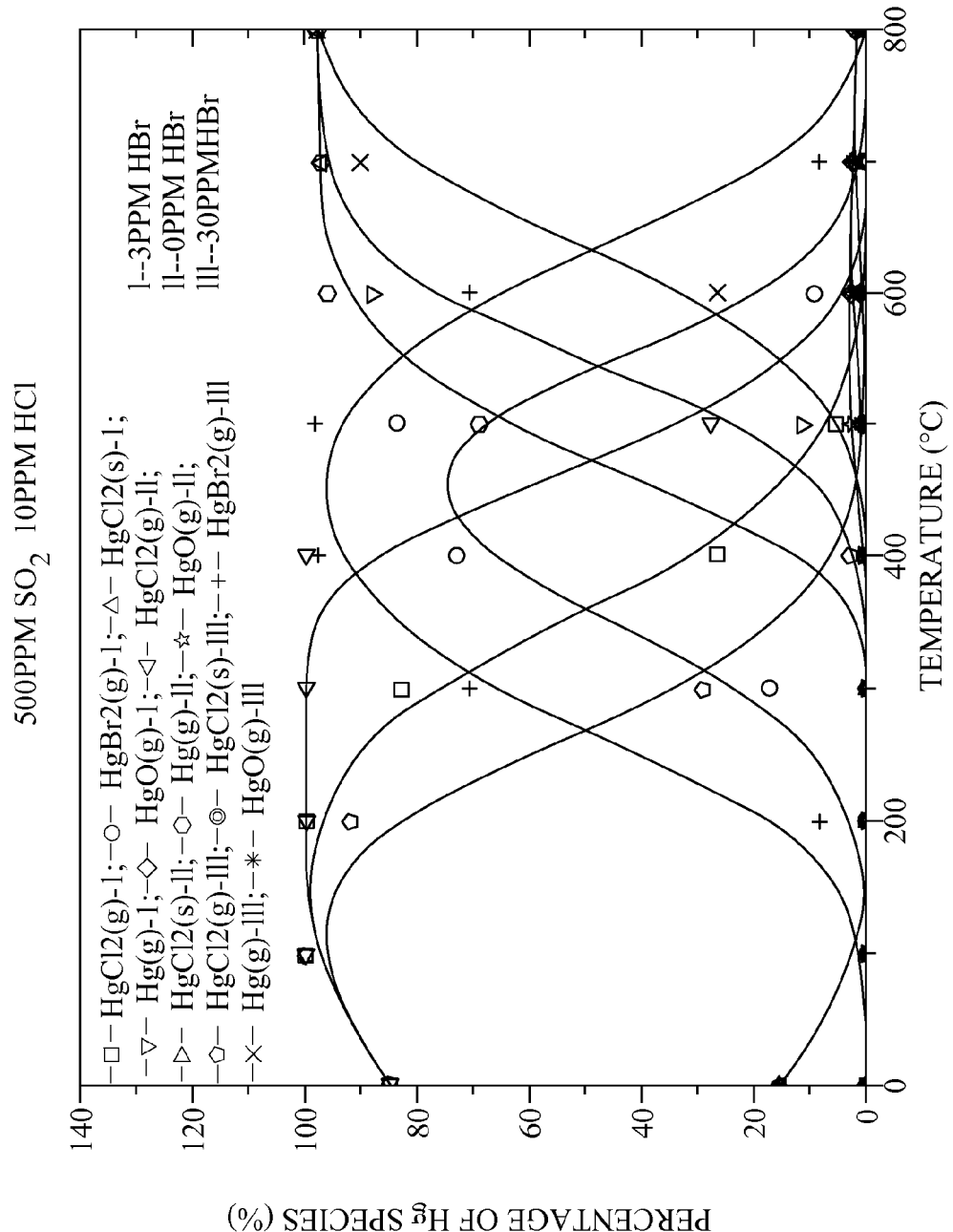

Thermodynamic calculation can provide information of possible products and their equilibrium concentrations after HBr addition into the flue gas. Calculation condition #1 refers to a typical Bituminous coal with medium sulfur and chlorine contents (about 1000 ppm $SO_2$ and 150 ppm HCl at 6% local $O_2$ concentration in the flue gas), condition #3 to bituminous coal with high sulfur and medium chlorine contents (about 1000 ppm $SO_2$ and 80 ppm HCl in the flue gas) and condition #2 to Sub-bituminous coal (PRB) or Lignite with low sulfur and chlorine contents (about 500 ppm $SO_2$ and 10 ppm HCl in the flue gas). The possible products after HBr addition into these three kinds of flue gas compositions are shown in FIGS. 8A to 8C, which correspond to the three calculation conditions. It was indicated that Hg, $HgCl_2$, HgO are the major products in the flue gas for all three calculation cases at thermodynamic equilibrium condition. All mercury species are in gas phase. $HgBr_2$ is a possible product after HBr addition into coal-fired flue gas; however, its concentration varied largely with HBr/HCl ratio and temperature window.

For a typical bituminous coal-fired flue gas with medium sulfur and high chlorine, it was indicated in FIG. 8A that more than 90% of the mercury occurred as $HgCl_2$ when the temperature was below 500° C. at the equilibrium status, and $Hg^0$ is the major mercury species when the temperature is above 700° C. at equilibrium status. Between 500° C. and 700° C., $HgCl_2$ and Hg have an inverse relationship that is dependent on the temperature—as one increases, the other decreases. However, $HgCl_2$ and Hg equilibrium curves will shift a little bit when HBr addition starts with a minimum concentration, such as 3 ppm. $HgBr_2$ species come out at a temperature range of 300° C. to 700° C., which overlaps with the temperature window of the transition between $HgCl_2$ and Hg. With this minimum HBr addition concentration at 3 ppm, the maximum percentage of $HgBr_2$ concentration relative to total mercury in the flue gas is only 5%. Hg and $HgCl_2$ are still the major mercury species in the flue gas. Increasing HBr addition concentration to 30 ppm will increase the maximum equilibrium concentration of $HgBr_2$ to 60%, and shift the equilibrium curve of $HgBr_2$ to the low temperature range. Corresponding to actual test conditions in this study, which temperature is about 300° C., the maximum $HgBr_2$ occurrence in the flue gas at equilibrium status is less than 5% at both different conditions of HBr addition in 3 ppm and 30 ppm. Decreasing HCl concentration in the flue gas in half, saying 80 ppm can increase equilibrium concentration of $HgBr_2$. However, the maximum $HgBr_2$ occurrence at equilibrium status is still below about 20% with the minimum addition of HBr at 4 ppm.

For the typical PRB or lignite coal-fired flue gas with low sulfur and chlorine contents, it is indicated in FIG. 8B that more than 90% of the mercury occurred as $HgCl_2$ when the temperature was below 400° C. at the equilibrium state, and Hg is the major mercury species when temperature is above 600° C. at equilibrium status. After HBr addition starts at 3 ppm, $HgCl_2$ and Hg equilibrium curves shift largely to low temperature and high temperature, respectively; therefore, the temperature window for $HgBr_2$ formation widens to 200° C. to 800° C. With this minimum $HBr_2$ addition concentration, the maximum percentage of $HgBr_2$ relative to total mercury in the flue gas is about 80% at a temperature of about 450° C. Increasing HBr addition concentration to 30 ppm will continue to shift the equilibrium curve to the low temperature range, to enlarge the occurrence window of $HgBr_2$, and to increase the maximum equilibrium concentration to 100% for $HgBr_2$. At temperatures around 300° F., the possibility of producing $HgBr_2$ in the flue gas at equilibrium status is about 15% and 75% for addition of 3 ppm and 30 ppm, respectively.

With comparison of test results in Examples 1-4 and thermodynamics mentioned herein, it may indicate that under a lower temperature range (around 300° C. such as in this study), HBr and HI will interact with HCl, which is available in the coal-fired flue gas, to generate interhalogens such as BrCl and ICl. BrCl and ICl also will make $Hg^0$ oxidation proceed fast. Thus, both $HgBr_2$ and $HgCl_2$, or $HgI_2$ and $HgCl_2$, are occurrences of oxidized mercury in the flue gas. This analysis also indicated all injection of all kinds of interhalogens, advantageously BrCL and ICl and BrI and et al, should be more effective on mercury oxidation.

Example 5

Figure 9:
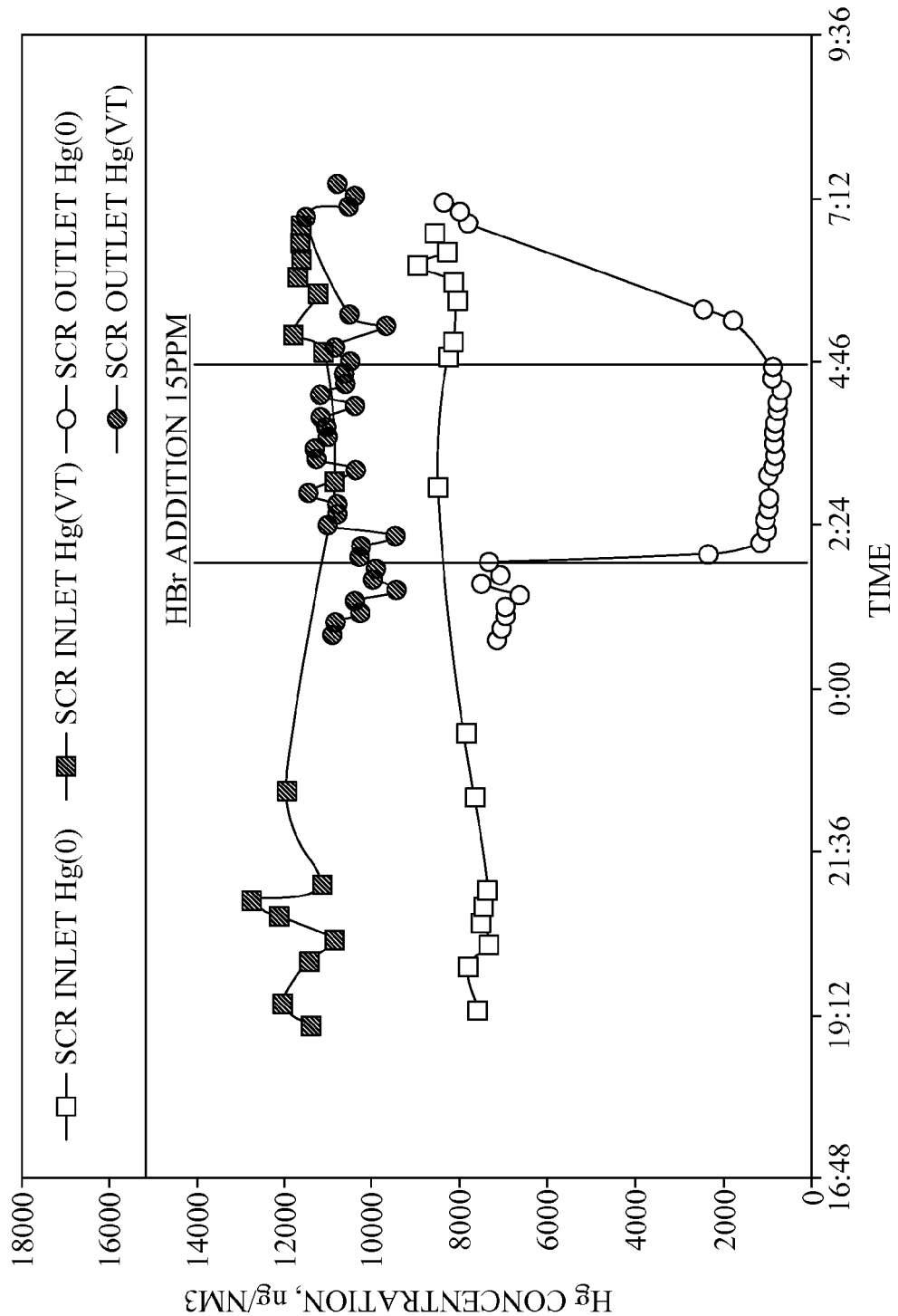
FIG. 9 is a graphical representation of $Hg^0$ oxidation with the introduction of HBr in the flue gas in the PRB-coal-derived flue gas in the slipstream reactor of FIG. 1.

Hydrogen Bromide (HBr) was added to injection port 110 and catalyst chambers 114 and 118 were not loaded with a catalyst. The effects of additions of HBr on $Hg^0$ oxidation in a PRB coal atmosphere at a concentration of 15 ppm in the empty slipstream reactor (ER) 100 are shown in FIG. 9. Baseline examples were conducted until the speciated mercury concentration stabilized within a 10% variation before HBr addition began. The baseline examples indicated that $Hg^0/Hg(VT)$ varied between 70% and 80% in the flue gas, which is typical mercury speciation at a temperature of about 330° C. when burning PRB coal having a lower natural chlorine content. In this example of HBr addition at 15 ppm, Hg(VT) at the SCR 102 outlet followed the trend of Hg(VT) at the SCR 102 inlet, which was kept almost constant. A strong effect of HBr on $Hg^0$ oxidation was found. As shown in FIG. 9, $Hg^0$ underwent a dramatic decrease by about 70% as compared to its baseline concentration after HBr addition started. An example using the OH Test Method, ASTM D6784-02, during the HBr addition at 15 ppm indicated that Hg(VT) at ER inlet was consistent with its baseline concentration of less than 10% variation. An oxidation effect was confirmed by the OH Test Method wherein $Hg^0/Hg(VT)$ at SCR 102 outlet decreased significantly from 68.2% at baseline conditions to 17.3%, about a 50% decrease, during HBr addition at 15 ppm. Results from a Consistent Emission Monitor (Hg-CEM) confirmed the OH Test Method results that a strong effect of the HBr addition on mercury oxidation in the flue gas atmosphere of PRB coal was realized at temperatures of about 330° C.

Example 6

Figure 10:
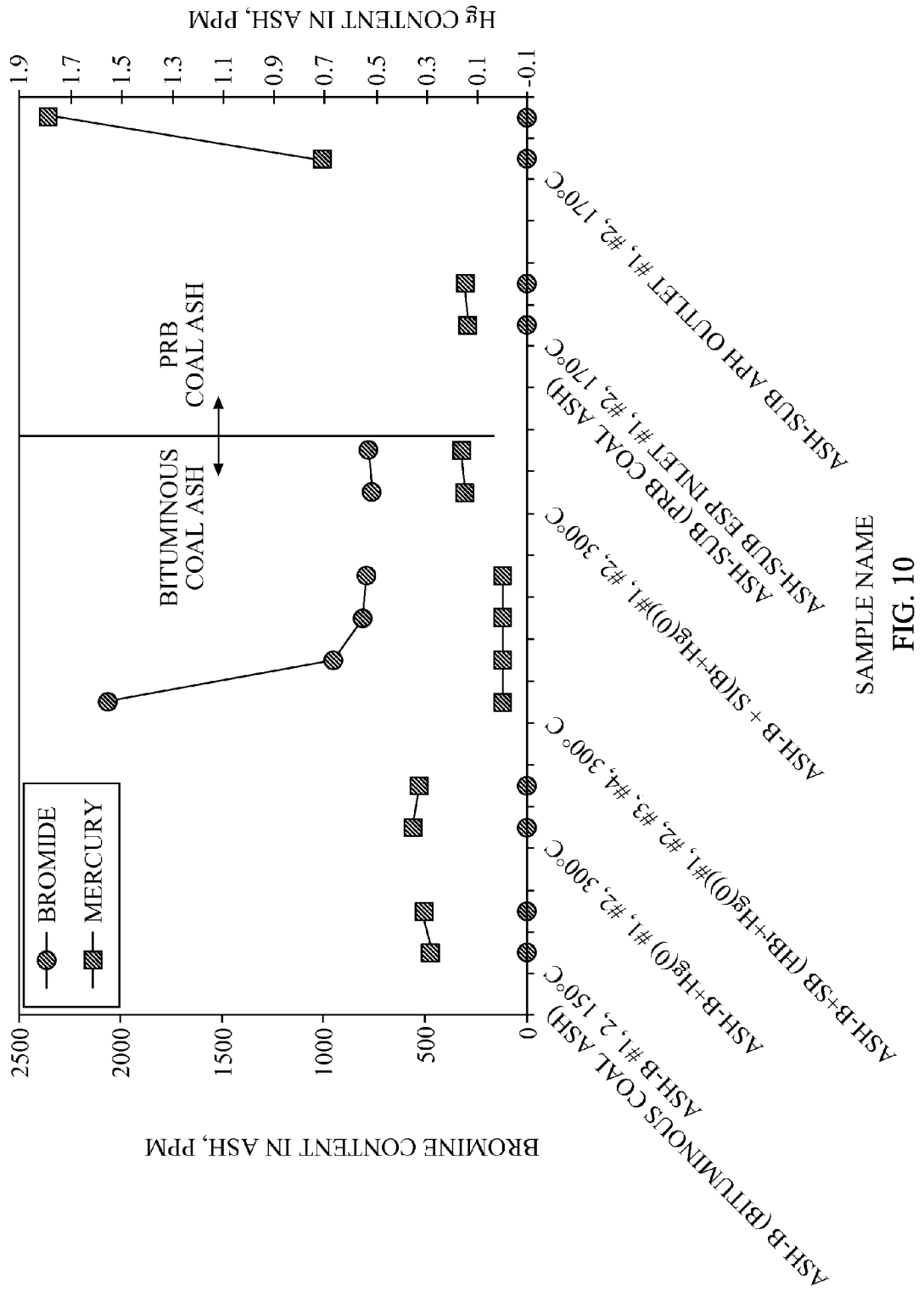
FIG. 10 is a graphical representation of mercury adsorption by brominated fly ash.

This example was conducted in a 1 in. lab-scale fixed bed reactor, such as reactor 100 shown in FIG. 1, between approximately 150° C. and 300° C., in which fly ash from bituminous or PRB coal was loaded and gas was passed therethrough. Fly ash was collected from the ESP hopper where the $Hg^0$ in the flue gas had been oxidized with HBr, such as the fly ash generated in Examples 3 and 5. An $Hg^0$ stream and an HBr stream were injected into a flue gas passed therethrough prior to the fly ash filled fixed bed, subsequently or simultaneously, to show the extent of mercury adsorption by brominated fly ash at different temperature ranges, the results of which are shown in FIG. 10. First, flue gas was passed through bituminous coal ash (Ash-B) where the temperature of the flue gas was about 150° C. to obtain a baseline. Secondly, the temperature was increased to about 300° C. and $Hg^0$ was injected into the flue gas (Ash-B+$Hg^0$). It is shown that the mercury content of treated fly ash at temperatures of about 300° C. did not change. The fly ash was then brominated with the addition of HBr and then $Hg^0$ was injected into the flue stream (Ash-B+SE(HBr+$Hg^0$)). The brominated fly ash did not capture the added $Hg^0$. In fact, the original mercury on the brominated fly ash (Hg(P)) was also almost entirely desorbed. Another example delivered HBr and $Hg^0$ simultaneously on the loaded fly ash in the fixed bed (Ash-B+SI–(HBr+$Hg^0$). This also indicates the loss of Hg(P) in the fly ash, as compared to that of its original Hg(P) content in the fly ash. In both of these cases, the Br content in the fly ash was concentrated above 800 ppm, as compared to that in the original fly ash, which was under the detection limit. It is shown that the bromine species on the fly ash caused the fly ash bound mercury to desorb at temperatures of about 300° C.

Fly ash, collected from the slipstream facility with or without HBr addition when PRB coal was burned, was subjected to the determination of their mercury and bromine contents. Hg(P) in the fly ash when HBr was not added in the slipstream facility, was about 0.1 ppm (Ash-Sub and Ash-Sub ESP inlet). Hg(P) in the fly ash collected from the sampling location of the cooling pass outlet, which simulates the function of the APH, varied between 0.7 and 1.7 ppm when HBr was added in the slipstream facility as indicated by the Ash-Sub APH Outlet #1, #2, 170° C. data points. It is shown in FIG. 10 that the bromine contents in fly ash samples, during HBr addition, from different sampling locations, were all under the detection limit. Hg(P) in the fly ash is shown to be independent of the bromine content in the fly ash. Thus, addition of HBr to the flue gas prior to entering the fly ash was shown to substantially increase the adsorption of Hg by the fly ash at temperatures less than 300°.

As shown in Examples 1-6, mercury can be strongly oxidized and/or associated with fly ash with the addition of a hydrogen halogen in flue gas atmospheres when burning bituminous and PRB coal. Fly ash is an important factor in both mercury oxidation and adsorption with the halogen species available in the flue gas. However, it was shown to function differently under higher and lower temperature ranges. Higher temperatures (in a range of 300° C. to 400° C.) promoted mercury oxidation with the injection of a hydrogen halogen but not mercury adsorption. Lower temperatures, below 300° C., advantageously in a range of 150° C.-200° C., enhanced mercury adsorption on the fly ash with the hydrogen halogen available in the flue gas. Flue gas atmosphere of different coals, such as bituminous and PRB, were shown to impact the mercury transformation and adsorption with hydrogen halogen additions. No corrosion of the reactor was observed in the reactor. FIG. 10 shows the halogens, for example Br in Example 6 (data points Ash-Sub APH Outlet #1, #2, 170° C.), are adsorped by fly ash. Therefore, halogen-doped fly is shown to enhance Hg oxidation and adsorbtion with the fly ash while simultaneously substantially reducing corrosion effects of halogens in the gas phase.

A process for removing $Hg^0$ from coal fired flue gas is provided. A hydrogen halogen selected from the group consisting of HBr, HI, HCl, HF, and combinations thereof is introduced into a coal fired flue gas having fly ash therein. The hydrogen(s) are introduced in the process before particulate or fly ash removal, i.e. before an ESP or FF, and may be introduced before or after optional process units such as a selective catalyst reactor and/or an air preheater. Hydrogen halogen(s) may also be added after particulate removal and be within the scope of the present invention. Advantageously, the hydrogen halogen(s) are introduced at a point in the process where the temperature of the flue gas is at most 400° C. The hydrogen halogen(s) may be introduced in gaseous, particulate, and/or in an aqueous form. The halogenated flue gas is then optionally passed through a selective catalytic reactor that may or may not have a catalyst therein. After oxidation of a portion of the $Hg^0$, a portion of the formed $Hg^{2+}$ is adsorbed with the fly ash in the coal fired flue stream. Advantageously, the flue gas is reduced to a temperature of at most 300° C., advantageously about 170° C., wherein a substantial portion of the $Hg^{2+}$ is adsorbed by the fly ash. At these lower temperatures, the salts adhered to the fly ash were stable as the mercury did not desorb. The fly ash having the oxidized elemental mercury is then removed from the flue gas by methods as are known in the art. The present invention can be implemented with most all coal fired systems with little modification.

Example 7

Example 7 was carried out in two phases in the same manner as Examples 1-6. In Phase I only hydrogen bromide was introduced into the flue gas stream and in Phase II both hydrogen bromide and selected fly ash were added simultaneously into the flue gas stream through injection port 110. In Phase I, only HBr was added to the flip stream reactor and in Phase II, HBr and selected fly ash were added simultaneously.

In Example 7, hydrogen bromide (Phase I) and the simultaneous addition of hydrogen bromide and selected fly ash (Phase II) were added to the injection port 110 and the average temperature of SCR 102 was controlled at about 155° C. Under flue gas conditions Phases I and II are exemplified burning Powder River Basin (PRB) coal. The residence time of the flue gas inside the reactor was about 1.4 seconds and the average temperature of the slip stream reactor was controlled at about 155° C.

A mercury semi-continuous emission monitor (SCEM) was used for observing the mercury variations during testing and an Ontario Hydro (OH) method was used for Hg-SCEM data validation. In Phase I, the average sulfur and mercury content in the tested coal were about 0.63% and 0.13 ppm, respectively. The detectable halogen constituents (chlorine and fluorine) in coal samples were lower, which were averaged at 164 ppm and 43 ppm, respectively. In Phase II, the average sulfur and mercury contents in the tested coal were about 0.59% and 0.12 ppm, respectively. The detectable halogen constituents (chlorine and fluorine) were at about ⅛ ppm and 80 ppm, respectively. The particle-bound mercury (Hg (P)) and LOI of fly ash were about 0.65 ppm and 0.78% for Phase I and 0.61 ppm and 0.58% for Phase II. The mercury capture efficiency reached about 50% at an HBr injection concentration of 4 ppm in the flue gas, but when simultaneously adding bituminous-derived fly ash in a minimum amount (30 lb/mMacf) increased the mercury capture efficiency by 30%.

Figure 11:
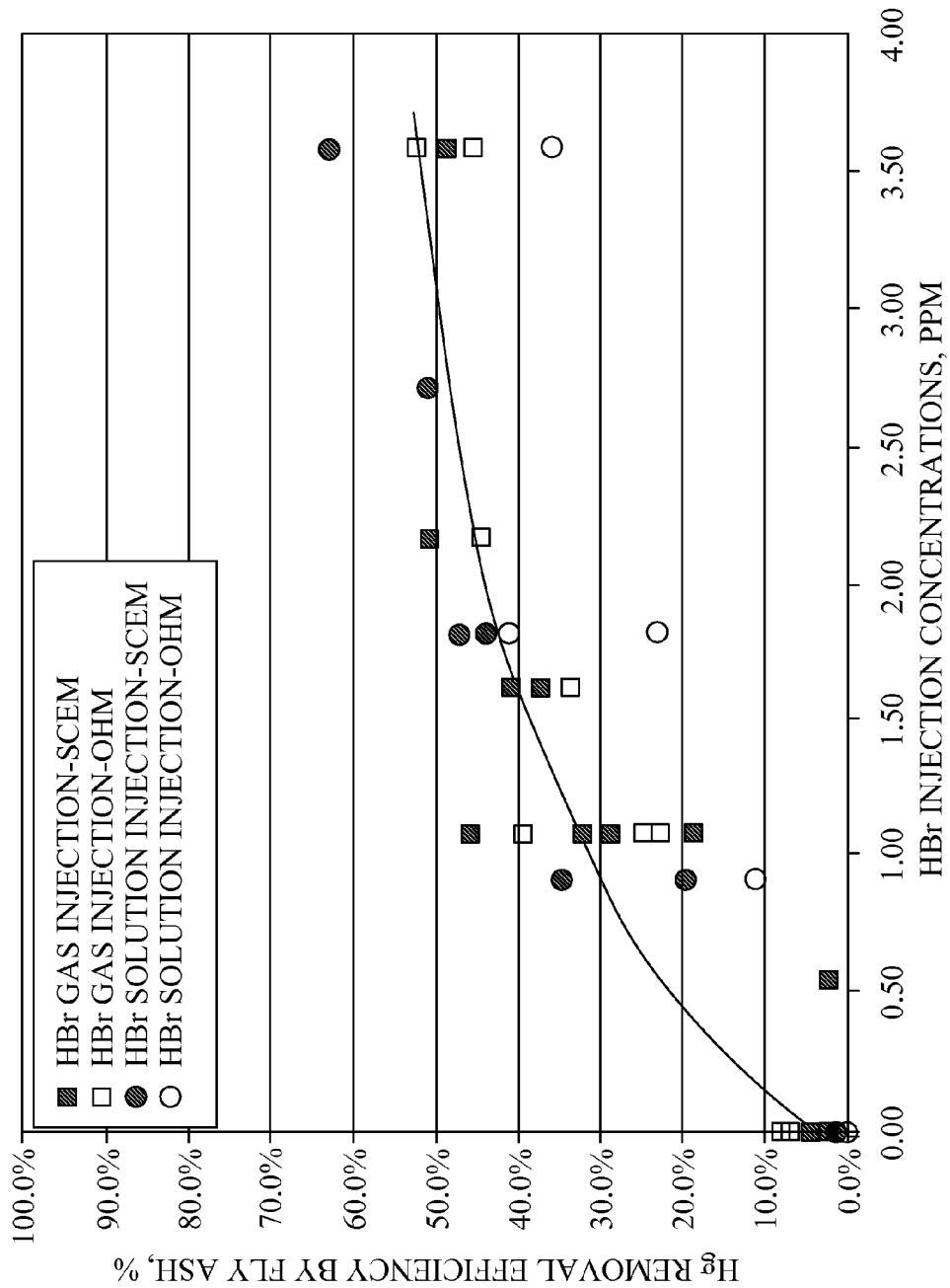
FIG. 11 is a graphical representation of $Hg^0$ removal as a function of HBr concentration in a flue gas in the slipstream reactor of FIG. 1.

Hydrogen bromide was added to injection point 110 and catalyst chambers 114 and 118 were not loaded with a catalyst. Unlike the situation where HBr was added during a higher temperature range (above 300° C. as illustrated in example 5), the $H_g$ (VT) (the total vapor phase mercury) at the outlet of the slip stream reactor decreased during the HBr addition under the lower temperature range of 155° C. The transformation of Hg (BT) to Hg (P), meant the adsorption of specialized mercury on the originally-occurring PRB-derived fly ash in the flue gas. In this example, the overall mercury removal efficiency was increased by increasing the HBr concentrations in the flue gas. As indicated in FIG. 11, HBr addition concentrations at 1.1 ppm, 1.8 ppm, 2.65 ppm and 3.5 ppm in the flue gas increased the overall mercury removal efficiency inside the slip stream reactor to about 30%, 40%, 47% and 50%, respectively. Mercury removal efficiency inside the slip stream reactor was only 5% on average, when adding HBr is not an option. Thus, a 45% of net mercury removal efficiency was obtained under the addition of HBr in the slip stream reactor at about 3.5 ppm. The HBr addition significantly increased the mercury capture capability of PRB-derived fly ash under a low temperature range.

Figure 12:
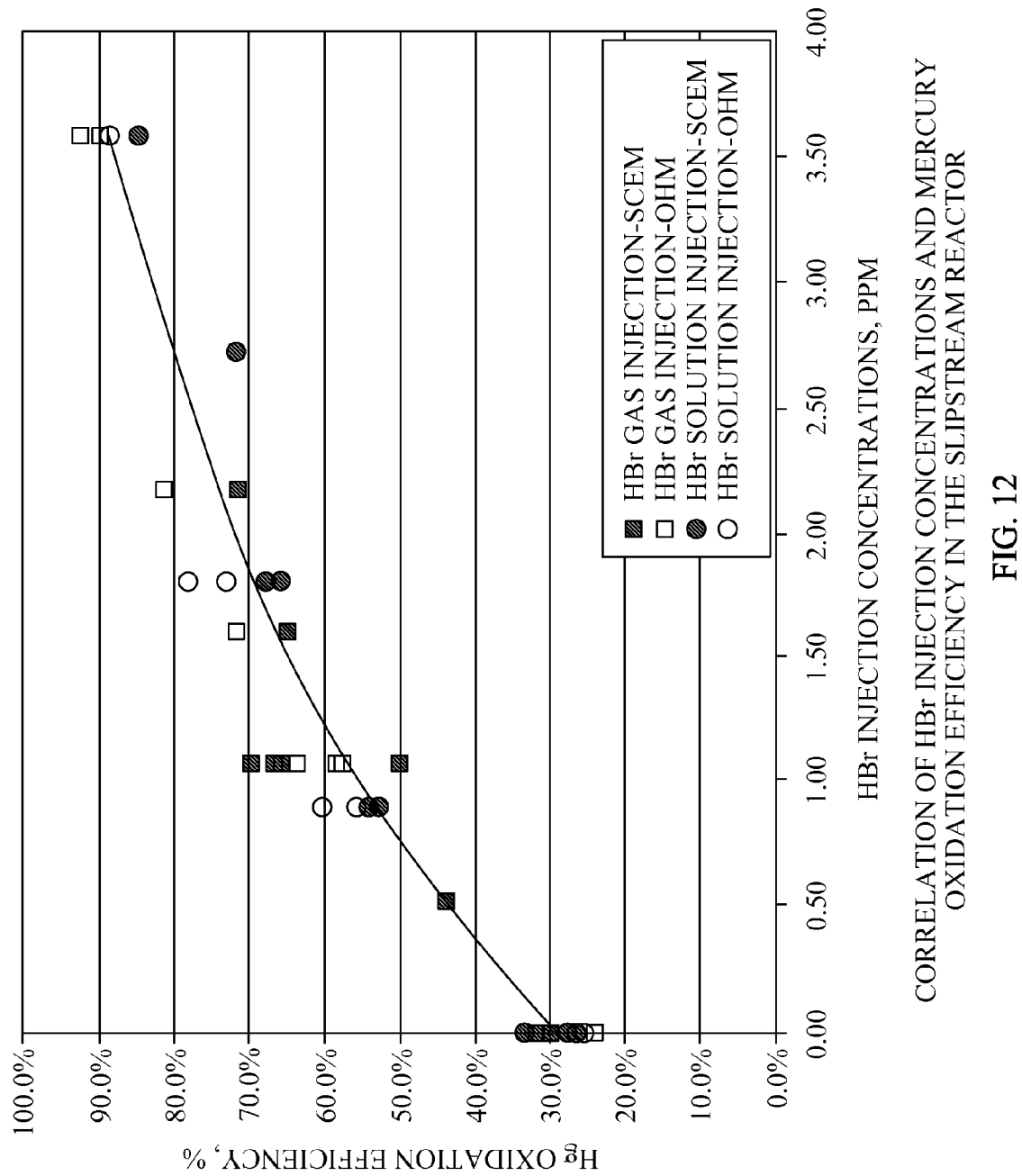
FIG. 12 is a graphical representation of $Hg^0$ oxidating as a function of HBr concentration in a flue gas in the slipstream reactor of FIG. 1.

FIG. 12 illustrates the effectiveness of the elemental mercury oxidation efficiency during Phase I HBr injection under low temperature operation. Similar to the case at a higher temperature range (above 300° C.), the addition of HBr into the slip stream reactor, under the lower temperature range (155° C.) in the shorter residence time (1.4 seconds) could also result in significant mercury oxidation. The HBr solution addition and an HBr gas injection function identically on mercury oxidation. As indicated in FIG. 12, the total mercury oxidation efficiencies were about 30%, 55%, 70% and 90%, at HBr addition concentrations in the flue gas of 0 ppm, 0.9 ppm, 1.8 ppm, and 3.5 ppm. OHM data matched SCM data and confirmed the effectiveness of HBr injection on mercury oxidation under these lower temperature operation conditions. It was found that the net of mercury oxidation efficiency was about 25%, 40%, and 60% under HBr addition concentrations of 0.9 ppm, 1.8 ppm and 3.5 ppm, respectively.

Figure 13:
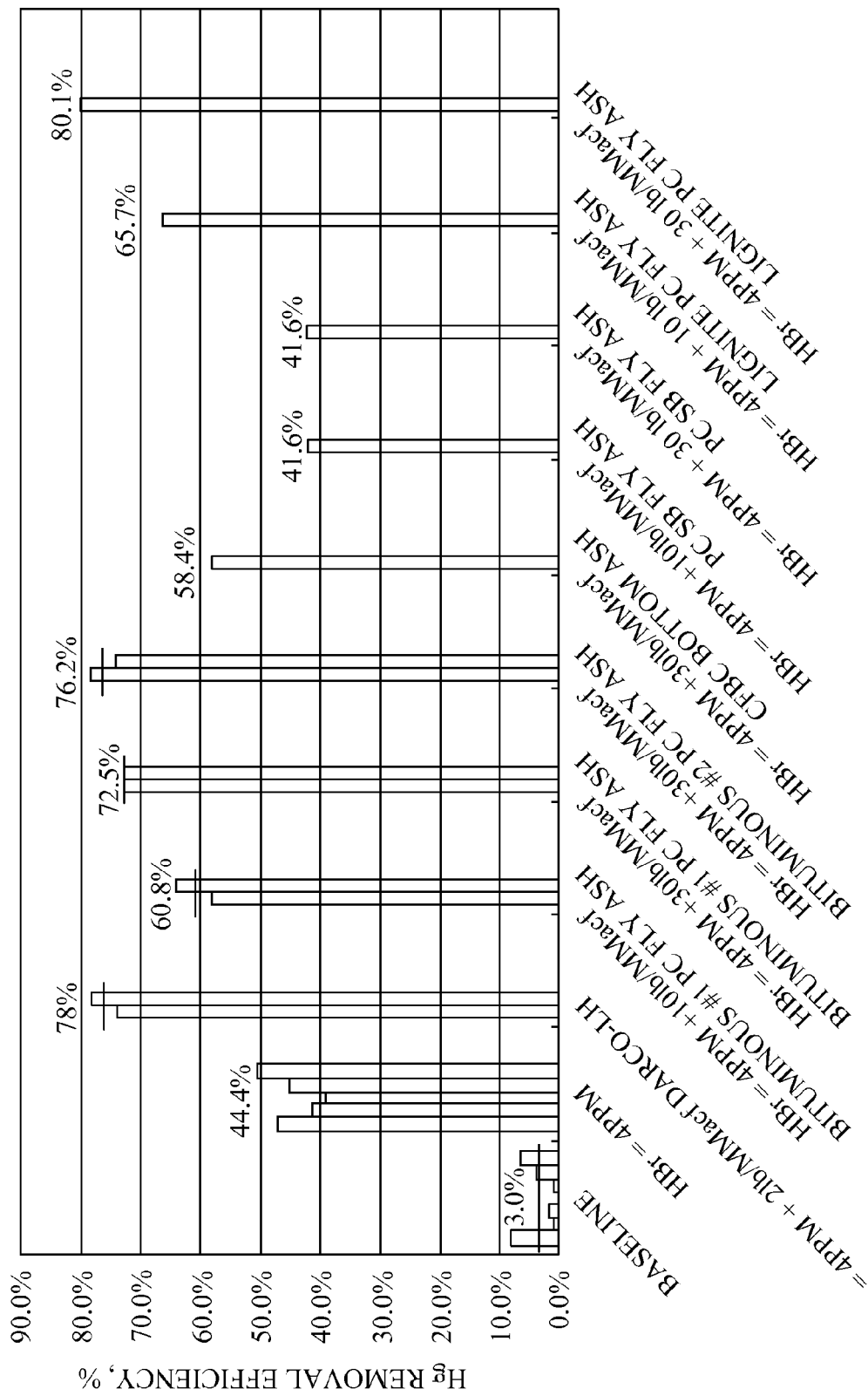
FIG. 13 is a graphical representation of $Hg^0$ removal efficiency by simultaneous additions of HBr and selected fly ashes in the slipstream reactor of FIG. 1.

In Phase II hydrogen bromide (HBr) and fly ash were added simultaneously to injection port 110 and catalyst chambers 114 and 118 were not loaded with the catalysts. FIG. 13 shows the average mercury removal efficiency by original PRB-coal-derived fly ash which was about 3%. With addition of HBr at 4 ppm, the total mercury removal efficiency increased to about 44.4%. Adding HBr at 4 ppm and a commercially available Darco LH absorbent increased the mercury removal efficiency to 76%. Moreover, a group of selected fly ash samples from different utility boilers was tested with the simultaneous addition of HBr at 4 ppm. It was found that a minimum amount of injected fly ash could result in the additional gain of mercury removal efficiency for bituminous-derived or lignite-derived fly ashes. Moreover, with the simultaneous addition of HBr at 4 ppm and PRB-derived fly ash at 10 lb/MMacf, there was no distinct increase in mercury removal of efficiency. For bituminous-derived fly ash, the addition of 10 lb/MMacf could increase mercury removal efficiency to 60.8%. Increasing the addition rate of bituminous-derived fly ash to 30 lb/MMacf increased the mercury removal efficiency to 72.5% and 76%. With the addition of lignite-derived fly ash at 10 lb/MMacf and HBr at 4 ppm, mercury removal efficiency remains about 65%. Increase in the addition of lignite-derived fly ash to about 30 lb/MMacf increased mercury removal efficiency to over 80%.

From Example 7 Phase I it is seen that in a low temperature range of about 155° C. in a relatively short residence time of about 1.4 seconds, the addition of HBr not only enhances mercury oxidation, but also promotes the transformation of mercury from the gas phase to the available fly ash in the flue gas. In Phase II HBr in the fly ash provides additional mercury capture on the fly ash. Under minimal addition of HBr, additions of minimal amounts of bituminous-derived or lignite-derived fly ashes improved mercury capture efficiency by injected fly ash.

Although the invention has been described in detail with reference to preferred embodiments and specific examples, variations and modifications exist within the scope and spirit of the invention as described and defined in the following claims.

What is claimed is:

1. A process for removing $Hg^0$ from coal fired flue gas comprising the steps of:
   a. combusting coal containing a halogen therein forming a first flue gas stream having said halogen and fly ash therein;
   b. maintaining said first flue gas stream at a temperature less than 400° C.;
   c. introducing a hydrogen halogen or an interhalogen into said first flue gas stream;
   d. oxidizing a substantial portion of $Hg^0$ in said first flue gas stream forming $Hg^{2+}$;
   e. absorbing a substantial portion of said $Hg^{2+}$ onto fly ash in said first flue gas stream; and, f. removing a substantial portion of said fly ash and said $Hg^{2+}$ adhered thereto from said first flue gas stream;

wherein step c includes introducing a second flue gas stream having a halogen or an interhalogen and fly ash therein, said second flue gas stream having a higher concentration of halogen than said first flue gas stream.

2. The process of claim 1 wherein said hydrogen halogen is selected from the group hydrogen fluoride, hydrogen chloride, hydrogen bromide and hydrogen iodide, and interhalogens selected from the group BrCl, BrI, and ICl.

3. The process of claim 1, said hydrogen halogen being hydrogen bromide.

4. The process of claim 1, said hydrogen halogen or interhalogen and said second flue gas stream being introduced simultaneously.

5. The process of claim 1 wherein said step b includes maintaining said flue gas stream at a temperature less than 400° C.

6. The process of claim 5 wherein maintaining said flue gas stream is at about 150° C.

7. A process for removing $Hg^0$ from coal fired flue gas comprising the steps of:
 a. combusting coal containing a halogen therein stream, forming a first flue gas stream having said halogen and fly ash therein;
 b. maintaining said first flue gas stream at a temperature less than 400° C.;
 c. introducing simultaneously a hydrogen halogen or an interhalogen and a second flue gas stream having a halogen and fly ash therein into said first flue gas stream forming a resultant third flue gas stream;
 d. oxidizing a substantial portion of $Hg^0$ in said flue gas stream forming $Hg^{2+}$;
 e. absorbing a substantial portion of said $Hg^{2+}$ onto fly ash in said third flue gas streams; and,
 f. removing a substantial portion of said fly ash and said $Hg^{2+}$ adhered thereto from said third flue gas stream.

8. The process of claim 7 wherein the maintaining said flue gas streams is at about 155° C.

9. The process of claim 7, said hydrogen halogen being hydrogen bromide.

10. The process of claim 7, said halogen in said second flue gas stream being bromine.

11. A process for removing $Hg^0$ from coal fired flue gas comprising the steps of:
 combusting coal containing a halogen therein forming a first flue gas stream having said halogen and fly ash therein;
 maintaining said first flue gas stream at a temperature less than 400° C.;
 introducing a hydrogen halogen or an interhalogen into said first flue gas stream, as well as a second flue gas stream having a halogen or an interhalogen into said fly ash, said second flue gas stream having a higher concentration of halogen than said first flue gas stream;
 oxidizing a substantial portion of $Hg^0$ in said first flue gas stream forming $Hg^{2+}$; absorbing a substantial portion of said $Hg^{2+}$ onto fly ash in said first flue gas stream; and,
 removing a substantial portion of said fly ash and said $Hg^{2+}$ adhered thereto from said first flue gas stream.

* * * * *